United States Patent
Hunter (10) Patent No.: US 11,117,603 B1
(45) Date of Patent: Sep. 14, 2021

(54) MOTORIZED MEDICINE CART

(71) Applicant: Shelia Hunter, Hertford, NC (US)

(72) Inventor: Shelia Hunter, Hertford, NC (US)

( * ) Notice: Subject to any disclaimer, the term of this patent is extended or adjusted under 35 U.S.C. 154(b) by 94 days.

(21) Appl. No.: 16/674,060

(22) Filed: Nov. 5, 2019

(51) Int. Cl.
| *B62B 3/00* | (2006.01) |
| *B62B 5/00* | (2006.01) |
| *A61G 12/00* | (2006.01) |
| *B62D 1/14* | (2006.01) |
| *B60L 53/14* | (2019.01) |

(52) U.S. Cl.
CPC ............ *B62B 3/005* (2013.01); *A61G 12/001* (2013.01); *B60L 53/14* (2019.02); *B62B 3/001* (2013.01); *B62B 5/00* (2013.01); *B62B 5/0033* (2013.01); *B62B 5/0069* (2013.01); *B62D 1/14* (2013.01)

(58) Field of Classification Search
CPC ........... B62B 3/005; B62B 3/001; B62B 5/00; B62B 5/0033; B62B 5/0069; B60L 53/14; A61G 12/001; B62D 1/14
USPC .......................................................... 180/210
See application file for complete search history.

(56) References Cited

U.S. PATENT DOCUMENTS

| | | | | |
|---|---|---|---|---|
| 5,673,983 A * | 10/1997 | Carlson | ................... | A47B 67/04 312/218 |
| 5,923,096 A * | 7/1999 | Manak | .................... | B60L 50/52 307/10.1 |
| 6,098,732 A * | 8/2000 | Romick | .................. | B62B 3/008 180/209 |
| 6,175,779 B1 * | 1/2001 | Barrett | ................. | A61G 12/001 700/242 |
| 6,604,019 B2 * | 8/2003 | Ahlin | ...................... | G07F 7/069 700/231 |
| 6,769,568 B2 * | 8/2004 | Bonini | ................. | A61G 12/001 221/123 |
| 6,775,591 B1 * | 8/2004 | Shoenfeld | ............ | A61G 12/001 221/121 |
| 7,108,090 B2 * | 9/2006 | Turner | ................. | B60K 7/0007 180/65.51 |
| D615,208 S | 5/2010 | Keffeler | | |
| 9,669,857 B1 * | 6/2017 | Rainey | ...................... | B62B 5/06 |
| 9,801,791 B2 | 10/2017 | Reckelhoff | | |
| 10,377,401 B2 * | 8/2019 | Thibault | .................. | B62B 3/02 |
| 2008/0128185 A1 * | 6/2008 | Hsieh | ....................... | B25H 3/00 180/54.1 |
| 2010/0004780 A1 * | 1/2010 | Rickelhoff | .............. | G06F 17/00 700/231 |
| 2010/0300130 A1 * | 12/2010 | Shoenfeld | ........... | G07F 17/0092 62/129 |

FOREIGN PATENT DOCUMENTS

DK      2384731      1/2013

* cited by examiner

*Primary Examiner* — John D Walters
*Assistant Examiner* — Hilary L Johns (57) ABSTRACT

The motorized medicine cart is a motorized vehicle. The motorized medicine cart is configured for use in distributing medication. The motorized medicine cart transports the medication and an individual designated to distribute the medication within a medical facility. The motorized medicine cart is driven by the designated individual. The motorized medicine cart comprises a medication cabinet, a vehicle structure, and a control circuit. The medication cabinet and the control circuit attach to the vehicle structure. The vehicle structure transports the medication cabinet and the individual through the medical facility. The control circuit controls the operation of the vehicle structure.

14 Claims, 5 Drawing Sheets

MOTORIZED MEDICINE CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of medical and veterinary science including conveyances, more specifically, a trolley for the transport of medicaments.

SUMMARY OF INVENTION

The motorized medicine cart is a motorized vehicle. The motorized medicine cart is configured for use in distributing medication. The motorized medicine cart transports the medication and an individual designated to distribute the medication within a medical facility. The motorized medicine cart is driven by the designated individual. The motorized medicine cart comprises a medication cabinet, a vehicle structure, and a control circuit. The medication cabinet and the control circuit attach to the vehicle structure. The vehicle structure transports the medication cabinet and the individual through the medical facility. The control circuit controls the operation of the vehicle structure.

These together with additional objects, features and advantages of the motorized medicine cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorized medicine cart in detail, it is to be understood that the motorized medicine cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized medicine cart.

It is therefore important that the claims be regarded as including such equivalent construction insofar as they do not depart from the spirit and scope of the motorized medicine cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The motorized medicine cart 100 (hereinafter invention) is a motorized vehicle. The invention 100 is configured for use in distributing medication. The invention 100 transports the medication and an individual designated to distribute the medication within a medical facility. The invention 100 is driven by the designated individual. The invention 100 comprises a medication cabinet 101, a vehicle structure 102, and a control circuit 103. The medication cabinet 101 and the control circuit 103 attach to the vehicle structure 102. The vehicle structure 102 transports the medication cabinet 101 and the individual through the medical facility. The control circuit 103 controls the operation of the vehicle structure 102.

The medication cabinet 101 is a furniture item. The medication cabinet 101 is a prism shaped structure. The medication cabinet 101 stores the medication distributed from the invention 100. The medication cabinet 101 mounts on the vehicle structure 102. The medication cabinet 101 comprises a cabinet shell 111, a pan 112, a plurality of medication drawers 113, a fixed shelf 114, and one or more rotating shelves 115.

The cabinet shell 111 is a rigid structure. The cabinet shell 111 is a prism shaped structure. The cabinet shell 111 forms the exterior surfaces of the medication cabinet 101. The pan 112 and the one or more rotating shelves 115 attach to the cabinet shell 111. The plurality of medication drawers 113 and the fixed shelf 114 mount in the cabinet shell 111. The cabinet shell 111 is a hollow structure. The cabinet shell 111 comprises a superior congruent end 141, an inferior congruent end 142, and a plurality of lateral faces 143.

The superior congruent end 141 is a congruent end of the prism structure of the cabinet shell 111. The superior congruent end 141 forms the superior face of the medication cabinet 101.

The inferior congruent end 142 is a congruent end of the prism structure of the cabinet shell 111. The inferior congruent end 142 forms the inferior face of the medication cabinet 101. The inferior congruent end 142 is the congruent end of the prism structure of the cabinet shell 111 that is distal from the superior congruent end 141.

Each of the plurality of lateral faces 143 is a lateral face of the prism structure of the cabinet shell 111. Each of the plurality of lateral faces 143 forms a portion of the containment of the hollow prism structure of the cabinet shell 111 that is perpendicular to the surfaces formed by the superior congruent end 141 and the inferior congruent end 142.

The pan 112 is a pan shaped structure. The pan 112 has a disk structure. The pan 112 forms the superior structure of the medication cabinet 101. The pan 112 forms a contained workspace used to process medication before dispensing. The pan 112 comprises a working surface 144 and a containment barrier 145.

The working surface 144 forms the closed congruent end of the disk structure of the pan 112. The working surface 144 is formed by the exterior surface of the superior congruent end 141 of the cabinet shell 111. The working surface 144 forms a horizontal surface on which the medications can be stored. The containment barrier 145 forms the lateral face of the disk structure that forms the pan 112. The containment barrier 145 forms a vertically oriented containment structure that prevents objects placed within the pan 112 from falling off of the cabinet shell 111.

Each of the plurality of medication drawers 113 is a drawer. Each of the plurality of medication drawers 113 is contained within the medication cabinet 101. Each of the plurality of medication drawers 113 is configured to contain medication destined for distribution. The use of a drawer as a storage device is well-known and documented in the mechanical and furniture arts. Each of the plurality of medication drawers 113 are accessible through a lateral face of the prism structure of the medication cabinet 101.

The fixed shelf 114 is a horizontal surface configured for use as storage. The fixed shelf 114 is accessible through a lateral face of the prism structure of the medication cabinet 101. The position of the fixed shelf 114 is between the plurality of medication drawers 113 and the inferior congruent end 142 of the cabinet shell 111.

Each of the one or more rotating shelves 115 forms a stowable work surface. Each of the one or more rotating shelves 115 attaches to a lateral face of the cabinet shell 111. Each of the one or more rotating shelves 115 rotates from a position where the stowable working surface is perpendicular to the lateral face of the prism structure of the medication cabinet 101 to a position where the stowable working surface is parallel and flush to the lateral face of the prism structure of the medication cabinet 101.

The vehicle structure 102 is a motorized vehicle. The vehicle structure 102 transports the medication distributed from the invention 100. The vehicle structure 102 transports the individual designated to distribute the medication from the invention 100. The vehicle structure 102 rolls over a supporting surface. The vehicle structure 102 is electrically powered. The vehicle structure 102 is pendently powered. The medication cabinet 101 attaches to the vehicle structure 102 such that the vehicle structure 102 elevates the medication cabinet 101 above the surface that supports the vehicle structure 102. The vehicle structure 102 is an independently powered electric circuit. By independently powered is meant that the vehicle structure 102 can operate without an electrical connection to an external power source 164.

The vehicle structure 102 comprises a seat 121, a cabinet ledge 122, a drive system 123, and a steering mount 124.

The seat 121 is a chair. The seat 121 forms the location on the vehicle structure 102 on which the individual sits during movement of the invention 100. The seat 121 mounts on the superior surface of the drive system 123.

The cabinet ledge 122 is a horizontal surface that projects away from the drive system 123. The cabinet ledge 122 forms an undercut ledge structure on which the medication cabinet 101 mounts. The cabinet ledge 122 comprises a cabinet slewing bearing 151. The cabinet slewing bearing 151 is a slewing bearing. The cabinet slewing bearing 151 attaches the inferior congruent end 142 of the cabinet shell 111 to the superior surface of the cabinet ledge 122 such that the cabinet shell 111 rotates relative to the cabinet ledge 122.

The drive system 123 is a mechanical device. The drive system 123 is an electrically powered device. The drive system 123 elevates the invention 100 above the supporting surface. The drive system 123 generates the motive forces required to move the invention 100 over the supporting surface. The drive system 123 comprises a drive chassis 152, a plurality of drive wheels 153, and a drive motor 154.

The drive chassis 152 is a mechanical structure that attaches the seat 121 to the steering mount 124. The plurality of drive wheels 153 attach to the drive motor 154. Each of the plurality of drive wheels 153 is a wheel that transfers a portion of the load of the invention 100 to the supporting surface. Each of the plurality of drive wheels 153 elevates the invention 100 above the supporting surface. A subset of the wheels selected from the drive chassis 152 are driven by the drive motor 154. The drive motor 154 is an electric motor. The drive motor 154 rotates the selected subset of wheels such that the selected subset of wheels transfers the motive forces required to move the invention 100 to the supporting surface. The control circuit 103 controls the operation of the drive motor 154. The speed of rotation of the drive motor 154 controls the speed of motion of the invention 100.

The steering mount 124 is a mechanical structure. The steering mount 124 is an electrically powered device. The steering mount 124 mounts rigidly within the drive system 123. The steering mount 124 generates the motive forces required to change the direction of motion of the invention 100 over the supporting surface. The steering mount 124 comprises a steering slewing bearing 155 and a steering motor 156.

The steering slewing bearing 155 is a bearing that rigidly attaches to the drive chassis 152. The steering slewing bearing 155 attaches the plurality of drive wheels 153 to the drive chassis 152 such that the plurality of drive wheels 153 rotates relative to the drive chassis 152. The steering motor 156 is an electric motor. The steering motor 156 attaches to the steering slewing bearing 155 and the plurality of drive wheels 153 such that the steering motor 156 rotates the plurality of drive wheels 153 within the steering slewing bearing 155. The rotation of the plurality of drive wheels 153 within the steering slewing bearing 155 determines the direction of travel of the invention 100.

Figure 1:
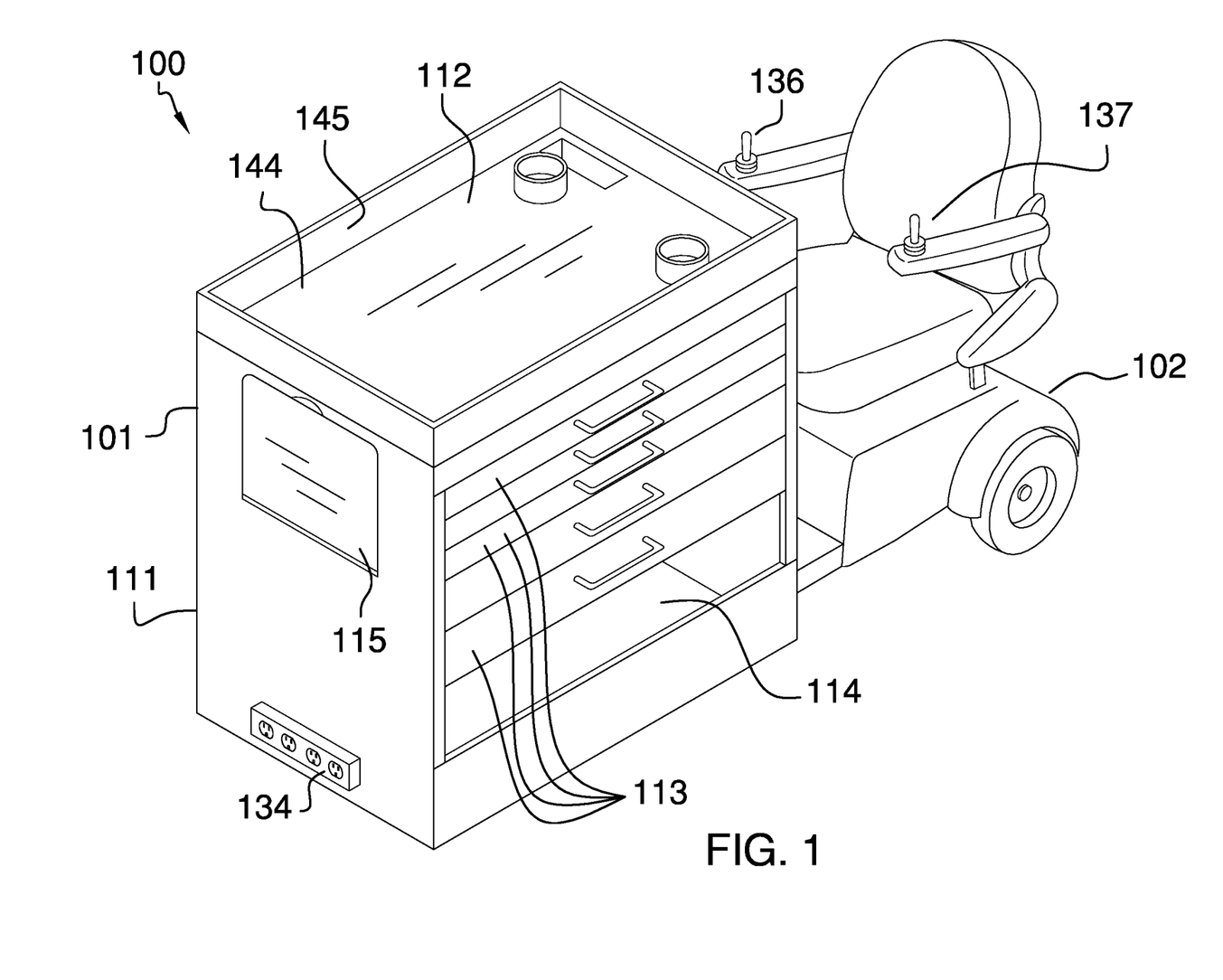
FIG. 1 is a perspective view of an embodiment of the disclosure.
Figure 2:
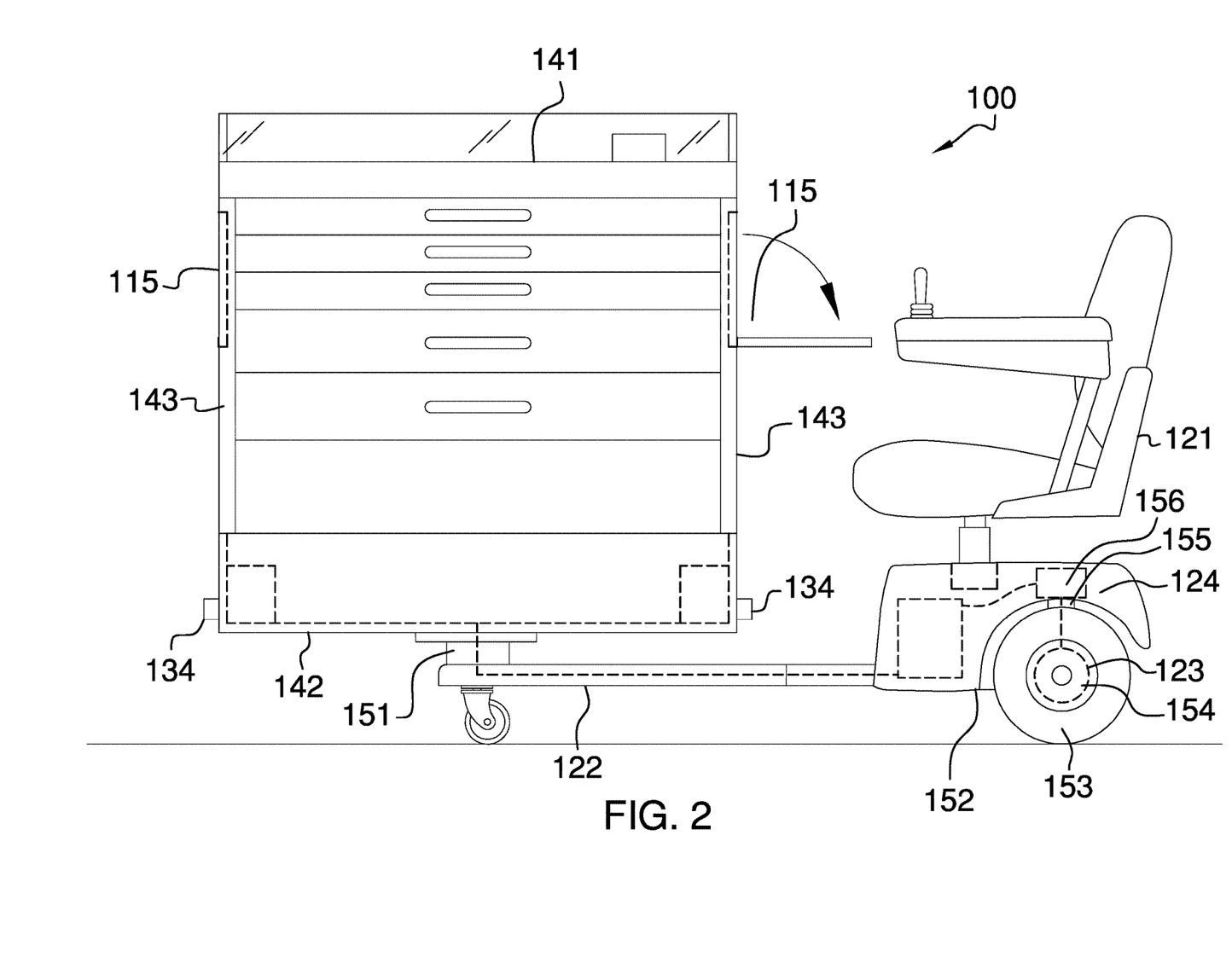
FIG. 2 is a side view of an embodiment of the disclosure.
Figure 3:
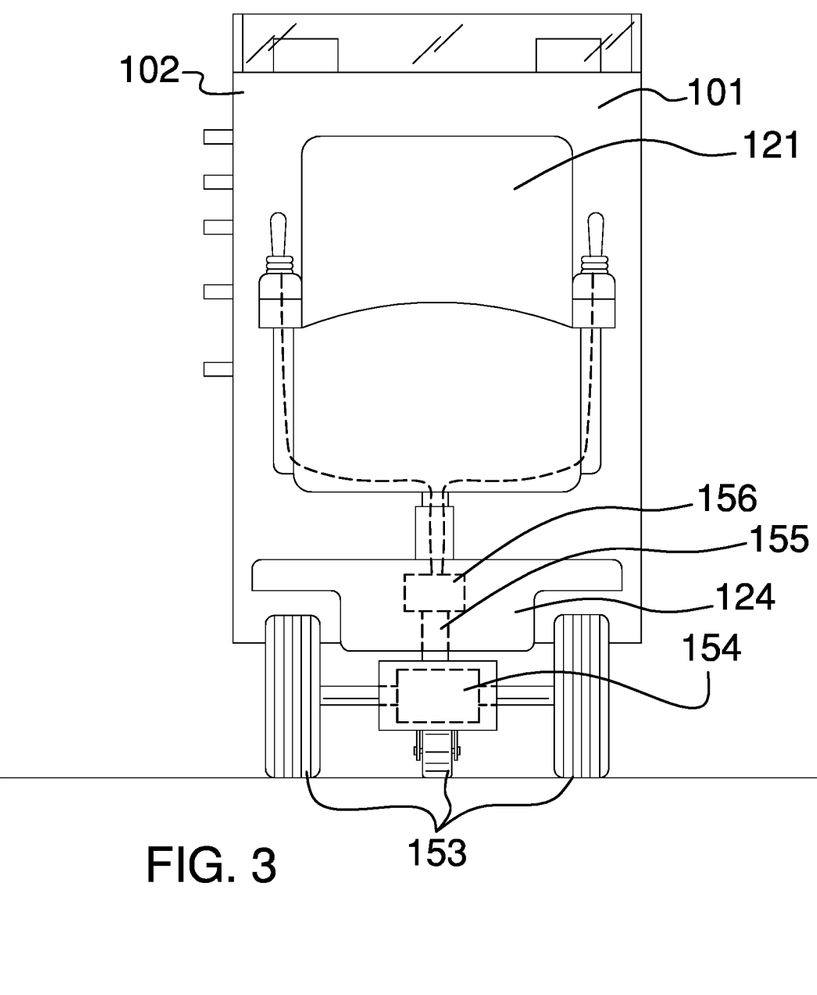
FIG. 3 is a rear view of an embodiment of the disclosure.
Figure 4:
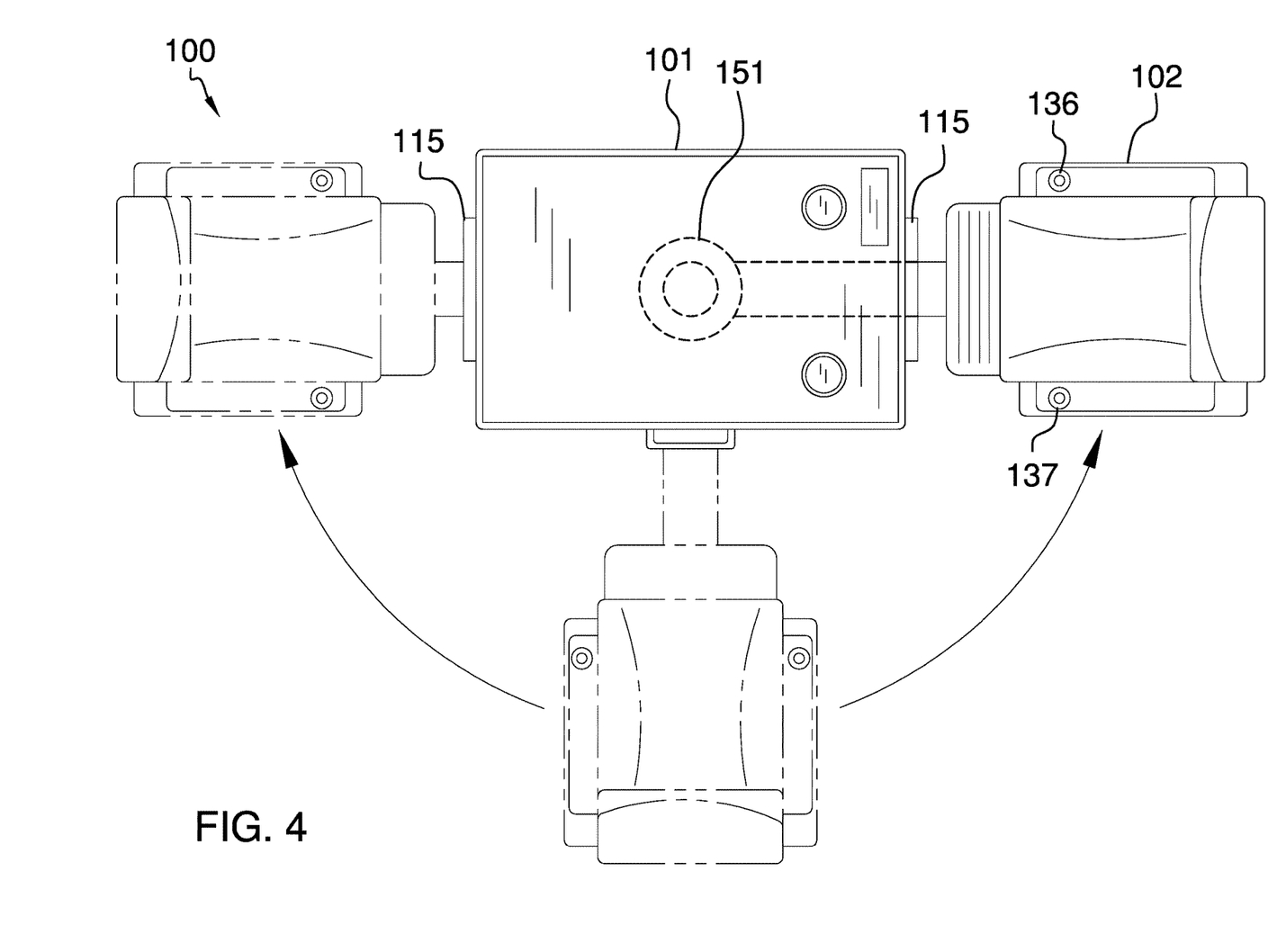
FIG. 4 is a top view of an embodiment of the disclosure.
Figure 5:
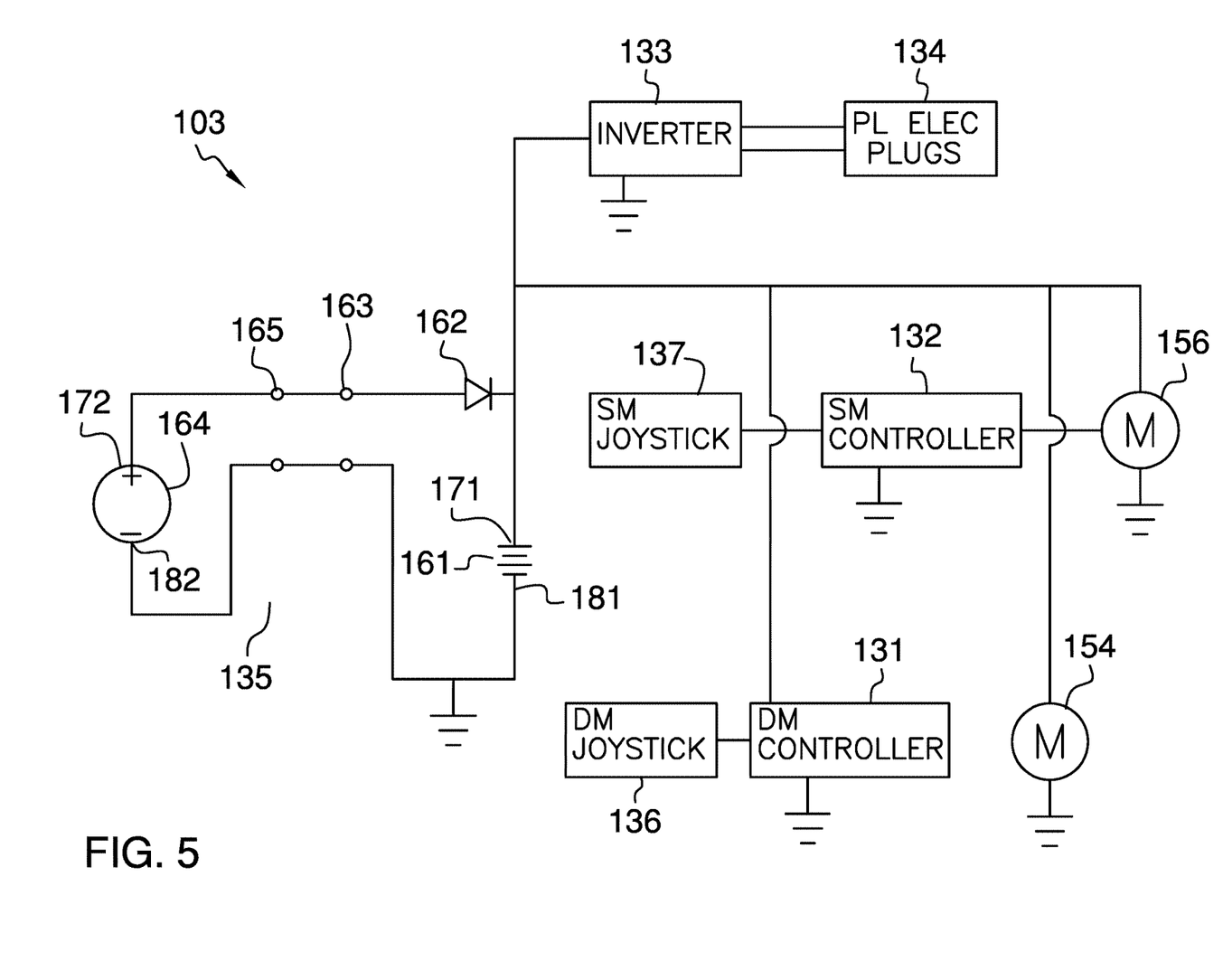
FIG. 5 is a schematic view of an embodiment of the disclosure.

The control circuit 103 is an electric circuit. The control circuit 103 controls the operation of the vehicle structure 102. The control circuit 103 controls the speed of motion of the vehicle structure 102. The control circuit 103 controls the direction of motion of the vehicle structure 102. The control circuit 103 is an independently powered electric circuit. By independently powered is meant that the control circuit 103 can operate without an electrical connection to an external power source 164. The control circuit 103 comprises a drive motor control 131, a steering motor control 132, a inverter 133, a plurality of electric ports 134, and a power circuit 135. The steering motor control 132 further comprises a steering motor joy stick 137. The drive motor control 131, the steering motor control 132, the inverter 133, the plurality of electric ports 134, and the power circuit 135 are electrically interconnected.

The drive motor control 131 is an electric circuit. The drive motor control 131 controls the operation of the drive motor 154 of the drive system 123. The drive motor control 131 controls the speed of motion of the vehicle structure 102 over the supporting surface. The drive motor control 131 further comprises a drive motor joy stick 136.

The steering motor control 132 is an electric circuit. The steering motor control 132 controls the operation of the steering motor 156 of the steering mount 124. The steering motor control 132 controls the direction of motion of the vehicle structure 102. The steering motor control 132 adjusts the direction of motion of the vehicle structure 102 by rotating the angle of the plurality of drive wheels 153 relative to the position of the medication cabinet 101.

The inverter 133 is an electric circuit. The inverter 133 converts dc electrical energy drawn from the power circuit 135 into ac electrical energy that is made available for use to the individual operating the invention 100 through the plurality of electric ports 134. The inverter 133 is defined elsewhere in this disclosure. The design and use of an inverter 133 for the purposes described in this disclosure are well known and documented in the electrical arts.

Each of the plurality of electric ports 134 is an electrical port. Each of the plurality of electric ports 134 is configured to receive a plug from an electrical device configured to operate off of ac electric energy. Each of the plurality of electric ports 134 transfers ac electric energy to the electrical device through the received plug.

The power circuit 135 is an electrical circuit. The power circuit 135 powers the operation of the control circuit 103. The power circuit 135 is an electrochemical device. The power circuit 135 converts chemical potential energy into the electrical energy required to power the control circuit 103. The power circuit 135 comprises a battery 161, a diode 162, a charging port 163, and an external power source 164. The external power source 164 further comprises a charging plug 165. The battery 161, the diode 162, the charging port 163, the external power source 164, and the charging plug 165 are electrically interconnected. The battery 161 is further defined with a first positive terminal 171 and a first negative terminal 181. The external power source 164 is further defined with a second positive terminal 172 and a second negative terminal 182.

The battery 161 is an electrochemical device. The battery 161 converts chemical potential energy into the electrical energy used to power the control circuit 103. The battery 161 is a commercially available rechargeable battery 161. The chemical energy stored within the rechargeable battery 161 is renewed and restored through use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 171 of the rechargeable battery 161 into the second positive terminal 172 of the external power source 164. In the first potential embodiment of the disclosure, the external power source 164, the charging plug 165, and the charging port 163 are compatible with USB power requirements.

The following definitions were used in this disclosure:

AC: As used in this disclosure, AC is an acronym for alternating current.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Battery: As used in this disclosure, a battery is a chemical device consisting of one or more cells, in which chemical energy is converted into electricity and used as a source of power. Batteries are commonly defined with a positive terminal and a negative terminal.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chair: As used in this disclosure, a chair is a structure that a person can sit on. Seat is a common synonym for a chair.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Dose: As used in this disclosure, the term dose refers to a specified measured quantity of a chemical substance that is to be incorporated or introduced into an organism or a mixture such as a recipe or a solution. The term dose often, but not necessarily, implies the introduction of a therapeutic substance or a pharmacologically active media into a patient.

Drawer: As used in this disclosure, a drawer is a storage compartment that is designed to slide into and out of a larger object.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

External Power Source: As used in this disclosure, an external power source is a source of the energy that is externally provided to enable the operation of the present disclosure. Examples of external power sources include, but are not limited to, electrical power sources and compressed air sources.

Flush: As used in this disclosure, the term flush is used to describe the alignment of a first surface and a second surface on a single plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inverter: As used in this disclosure, an inverter is an electrical device that converts a DC voltage into an AC voltage. Methods to design and build inverters are well known in the electrical arts.

Ledge: As used in this disclosure, a ledge is a horizontal surface that projects away from a vertical structure. A ledge that projects away from, or overhangs, the vertical structure in the manner of a cantilever is referred to as an undercut ledge.

Medication: As used in this disclosure, a medication is a pharmacologically active media that is specifically prepared for therapeutic used.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Pharmacologically Active Media: As used in this disclosure, a pharmacologically active media refers to a chemical substance that has a biochemical or physiological effect on a biological organism.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rigid Structure: As used in this disclosure, a rigid structure is a solid structure formed from an inelastic material that resists changes in shape. A rigid structure will permanently deform as it fails under a force.

Seat: As used in this disclosure, a seat is a structure that a person can sit on. Chair is a common synonym for a seat.

Slewing Bearing: As used in this disclosure, a slewing bearing is a device that is used to rotate an object on a horizontal surface. Slewing bearings are often called turntable bearings or a lazy Susan bearing.

Superior: As used in this disclosure, the term superior refers to a directional reference that is parallel to and in the opposite direction of the force of gravity when an object is positioned or used normally.

Therapeutic: As used in this disclosure, therapeutic is an adjective that refers to a medical, ameliorative, or hygienic substance, process, or procedure.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

The following definitions and directional references were used in this disclosure:

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A motorized medicine cart comprising
wherein the motorized medicine cart is a motorized vehicle;
wherein the motorized medicine cart is configured for use in distributing medication;
wherein the motorized medicine cart comprises a medication cabinet, a vehicle structure, and a control circuit;
wherein the medication cabinet and the control circuit attach to the vehicle structure;
wherein the vehicle structure transports the medication cabinet and is configured to transport an individual through a medical facility;
wherein the control circuit controls the operation of the vehicle structure;
wherein the medication cabinet is a furniture item;
wherein the medication cabinet is a prism shaped structure;
wherein the medication cabinet stores the medication distributed from the motorized medicine cart;
wherein the medication cabinet mounts on the vehicle structure;
wherein the vehicle structure is a motorized vehicle;
wherein the medication cabinet attaches to the vehicle structure such that the vehicle structure elevates the medication cabinet above the surface that supports the vehicle structure;
wherein the vehicle structure rolls over a supporting surface;
wherein the vehicle structure is electrically powered;
wherein the vehicle structure is independently powered such that the vehicle structure can operate without an electrical connection to an external power source;
wherein the control circuit is an electric circuit;
wherein the control circuit controls the operation of the vehicle structure;
wherein the control circuit controls the speed of motion of the vehicle structure;
wherein the control circuit controls the direction of motion of the vehicle structure;
wherein the control circuit is an independently powered electric circuit such that the control circuit can operate without an electrical connection to an external power source;
wherein the medication cabinet comprises a cabinet shell, a pan, a plurality of medication drawers, a fixed shelf, and one or more rotating shelves;
wherein the pan and the one or more rotating shelves attach to the cabinet shell;
wherein the plurality of medication drawers and the fixed shelf mount in the cabinet shell;
wherein the vehicle structure comprises a seat, a cabinet ledge, a drive system, and a steering mount;
wherein the seat mounts on the superior surface of the drive system;
wherein the cabinet ledge is a horizontal surface that projects away from the drive system;
wherein the drive system generates the motive forces required to move the motorized medicine cart over the supporting surface;
wherein the steering mount generates the motive forces required to change the direction of motion of the motorized medicine cart over the supporting surface.

2. The motorized medicine cart according to claim 1
wherein the control circuit comprises a drive motor control, a steering motor control, an inverter, a plurality of electric ports, and a power circuit;
wherein the drive motor control, the steering motor control, the inverter, the plurality of electric ports, and the power circuit are electrically interconnected.

3. The motorized medicine cart according to claim 2
wherein the cabinet shell is a rigid structure;
wherein the cabinet shell is a prism shaped structure;
wherein the cabinet shell forms the exterior surfaces of the medication cabinet;
wherein the cabinet shell is a hollow structure.

4. The motorized medicine cart according to claim 3
wherein the pan is a pan shaped structure;
wherein the pan has a disk structure;

wherein the pan forms the superior structure of the medication cabinet;
wherein the pan forms a contained workspace used to process medication before dispensing.

5. The motorized medicine cart according to claim 4
wherein the cabinet shell comprises a superior congruent end, an inferior congruent end, and a plurality of lateral faces;
wherein the superior congruent end is a congruent end of the prism structure of the cabinet shell;
wherein the superior congruent end forms the superior face of the medication cabinet;
wherein the inferior congruent end is a congruent end of the prism structure of the cabinet shell;
wherein the inferior congruent end forms the inferior face of the medication cabinet;
wherein the inferior congruent end is the congruent end of the prism structure of the cabinet shell that is distal from the superior congruent end;
wherein each of the plurality of lateral faces is a lateral face of the prism structure of the cabinet shell;
wherein each of the plurality of lateral faces forms a portion of the containment of the hollow prism structure of the cabinet shell that is perpendicular to the surfaces formed by the superior congruent end and the inferior congruent end.

6. The motorized medicine cart according to claim 5
wherein the pan comprises a working surface and a containment barrier;
wherein the working surface forms the closed congruent end of the disk structure of the pan;
wherein the working surface is formed by the exterior surface of the superior congruent end of the cabinet shell;
wherein the working surface forms a horizontal surface on which the medications can be stored;
wherein the containment barrier forms the lateral face of the disk structure that forms the pan;
wherein the containment barrier forms a vertically oriented containment structure that prevents objects placed within the pan from falling off of the cabinet shell.

7. The motorized medicine cart according to claim 6
wherein each of the plurality of medication drawers is a drawer;
wherein each of the plurality of medication drawers is contained within the medication cabinet;
wherein each of the plurality of medication drawers is configured to contain medication destined for distribution;
wherein each of the plurality of medication drawers are accessible through a lateral face of the prism structure of the medication cabinet.

8. The motorized medicine cart according to claim 7
wherein the fixed shelf is a horizontal surface configured for use as storage;
wherein the fixed shelf is accessible through a lateral face of the prism structure of the medication cabinet;
wherein the position of the fixed shelf is between the plurality of medication drawers and the inferior congruent end of the cabinet shell;
wherein each of the one or more rotating shelves forms a stowable work surface;
wherein each of the one or more rotating shelves attaches to a lateral face of the cabinet shell;
wherein each of the one or more rotating shelves rotates from a position where the stowable working surface is perpendicular to the lateral face of the prism structure of the medication cabinet to a position where the stowable working surface is parallel and flush to the lateral face of the prism structure of the medication cabinet.

9. The motorized medicine cart according to claim 8
wherein the seat is a chair;
wherein the cabinet ledge forms an undercut ledge structure on which the medication cabinet mounts;
wherein the cabinet ledge comprises a cabinet slewing bearing;
wherein the cabinet slewing bearing is a slewing bearing;
wherein the cabinet slewing bearing attaches the inferior congruent end of the cabinet shell to the superior surface of the cabinet ledge such that the cabinet shell rotates relative to the cabinet ledge;
wherein the drive system is a mechanical device;
wherein the drive system is an electrically powered device;
wherein the drive system elevates the motorized medicine cart above the supporting surface;
wherein the steering mount is a mechanical structure;
wherein the steering mount is an electrically powered device;
wherein the steering mount mounts rigidly within the drive system.

10. The motorized medicine cart according to claim 9
wherein the drive system comprises a drive chassis, a plurality of drive wheels, and a drive motor;
wherein the drive chassis is a mechanical structure that attaches the seat to the steering mount;
wherein the plurality of drive wheels attach to the drive motor;
wherein Each of the plurality of drive wheels is a wheel that transfers a portion of the load of the motorized medicine cart to the supporting surface;
wherein each of the plurality of drive wheels elevates the motorized medicine cart above the supporting surface;
wherein a subset of the wheels selected from the drive chassis are driven by the drive motor;
wherein the drive motor is an electric motor;
wherein the drive motor rotates the selected subset of wheels such that the selected subset of wheels transfers the motive forces required to move the motorized medicine cart to the supporting surface;
wherein the control circuit controls the operation of the drive motor;
wherein the speed of rotation of the drive motor controls the speed of motion of the motorized medicine cart.

11. The motorized medicine cart according to claim 10
wherein the steering mount comprises a steering slewing bearing and a steering motor;
wherein the steering slewing bearing is a bearing that rigidly attaches to the drive chassis;
wherein the steering slewing bearing attaches the plurality of drive wheels to the drive chassis such that the plurality of drive wheels rotates relative to the drive chassis;
wherein the steering motor is an electric motor;
wherein the steering motor attaches to the steering slewing bearing and the plurality of drive wheels such that the steering motor rotates the plurality of drive wheels within the steering slewing bearing;
wherein the rotation of the plurality of drive wheels within the steering slewing bearing determines the direction of travel of the motorized medicine cart.

12. The motorized medicine cart according to claim 11
wherein the drive motor control is an electric circuit;
wherein the drive motor control controls the operation of the drive motor of the drive system;
wherein the drive motor control controls the speed of motion of the vehicle structure over the supporting surface;
wherein the steering motor control is an electric circuit;
wherein the steering motor control controls the operation of the steering motor of the steering mount;
wherein the steering motor control controls the direction of motion of the vehicle structure;
wherein the steering motor control adjusts the direction of motion of the vehicle structure by rotating the angle of the plurality of drive wheels relative to the position of the medication cabinet;
wherein the steering motor control further comprises a steering motor joy stick;
wherein the drive motor control further comprises a drive motor joy stick.

13. The motorized medicine cart according to claim 12
wherein the inverter is an electric circuit;
wherein the inverter converts dc electrical energy drawn from the power circuit into ac electrical energy that is made available for use to the individual operating the motorized medicine cart through the plurality of electric port;
wherein the inverter is defined elsewhere in this disclosure;
wherein each of the plurality of electric ports is an electrical port;
wherein each of the plurality of electric ports is configured to receive a plug from an electrical device configured to operate off of ac electric energy;
wherein each of the plurality of electric ports transfers ac electric energy to the electrical device through the received plug.

14. The motorized medicine cart according to claim 12
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit;
wherein the power circuit comprises a battery, a diode, a charging port, and an external power source;
wherein the external power source further comprises a charging plug;
wherein the battery, the diode, the charging port, the external power source, and the charging plug are electrically interconnected;
wherein the battery is further defined with a first positive terminal and a first negative terminal;
wherein the external power source is further defined with a second positive terminal and a second negative terminal;
wherein the battery is a rechargeable battery;
wherein the charging port is an electrical circuit that reverses the polarity of the rechargeable battery;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

* * * * *